United States Patent

[11] 3,602,295

| [72] | Inventor | Ernst A. Klaas<br>Dorn, Germany |
|---|---|---|
| [21] | Appl. No. | 858,278 |
| [22] | Filed | Sept. 16, 1969 |
| [45] | Patented | Aug. 31, 1971 |
| [73] | Assignee | Gebruder Thielmann |
| [32] | Priority | Sept. 17, 1968 |
| [33] | | Germany |
| [31] | | P 17 76 079.1 |

[54] AIR CONDITIONER FOR AUTOMOTIVE VEHICLES
11 Claims, 3 Drawing Figs.

[52] U.S. Cl. ................................................. 165/23, 62/500
[51] Int. Cl. ..................................................... B60h 3/04
[50] Field of Search ............................................. 165/23, 42–44; 62/500

[56] References Cited
UNITED STATES PATENTS

| 2,401,861 | 6/1946 | Cunningham ............... | 165/42 |
| 2,783,622 | 5/1957 | Bourassa ..................... | 165/43 |
| 2,829,869 | 4/1958 | Phillip .......................... | 165/43 |
| 3,500,897 | 3/1970 | Von Cube .................... | 165/43 |

*Primary Examiner*—Charles Sukalo
*Attorney*—Karl F. Ross

ABSTRACT: A vehicular air conditioner has a closed path for the circulation of a cooling fluid via a jet pump acting as a compressor, a condenser, an expansion valve and an evaporator, the driving fluid for the jet pump being branched off the output of the compressor and led through a vaporizer subjected to the exhaust heat of the vehicle. The branched-off fluid path includes another pump which may be of the mechanical type or may be another jet pump driven by the output of the vaporizer. For winter driving, the hot gases from the vaporizer may be circulated through the evaporator coil as a heating fluid.

Ernst-A. Klaas
INVENTOR

BY
Karl F. Ross
Attorney

AIR CONDITIONER FOR AUTOMOTIVE VEHICLES

My present invention relates to an air conditioner for automotive vehicles, particularly (though not exclusively) for passenger cars, using a closed circuit for the circulation of a conventional cooling fluid such as chlorinated and/or fluorinated hydrocarbons (e.g. difluorochloromethane).

Conventional vehicular cooling systems utilize a mechanical compressor which, together with an expansion valve forming a constriction remote from the compressor in the fluid path, divides that path into a low-pressure upstream section and a high-pressure downstream section; the upstream section includes a vaporizer in the form of a cooling coil in heat-exchanging relationship with its surrounding, the downstream section including a condenser which liquefies the compressed fluid before returning it to the expansion valve. After expanding adiabatically at that valve, the fluid travels at greatly reduced temperature to the cooling coil where it is vaporized while absorbing heat from the surrounding air.

The power required to drive the mechanical compressor, such as a piston pump, is supplied by the vehicular engine and frequently constitutes a substantial part of the engine load. Such circulating pumps are, moreover, relatively expensive if they are to withstand the shocks and stresses to which they are subjected in an automotive vehicle.

The general object of my present invention is to provide an air-conditioning system for automotive vehicles which does not tax the vehicular engine in the manner of conventional systems and which operates at considerably greater efficiency while being of relatively simple and inexpensive construction.

A secondary object is to provide a vehicular air conditioner capable of being converted from a cooling system to a heating system for cold-weather driving.

In accordance with my present invention, I utilize as the compressor for the circulating fluid jet pump deriving its propellant from the fluid circuit itself, via a branch line deviated from the downstream section of that circuit at a location beyond its condenser; this branch line, terminating at a propellant inlet of the jet pump, includes a vaporizer exposed to a source of waste heat available in the vehicle, such as a duct carrying the exhaust gases of the engine.

Means must be provided in this branch line for feeding the deviated fluid portion, i.e. the propellant for the jet pump, to the vaporizer at a rate consistent with the required heat transfer. This calls for the installation of a secondary pump in the branch circuit together with, preferably, level-control means in a vessel which forms part of the vaporizer and in which the oncoming liquid propellant is temporarily stored. Since the volume of fluid traversing the branch path in unit time is relatively low, I may use for the feeding of the propellant a simple mechanical pump which could be driven by a small motor powered by the vehicular battery. Where the level-control mechanism includes a float-controlled valve in the inlet to the vaporizer vessel, this secondary pump should be of the nonpositive type or should be provided with a bypass controlled by an overload valve. In accordance with another feature of my invention, however, I design this secondary pump also as a jet pump provided with a driving-fluid connection through which part of the output of the vaporizer is returned to that pump to accelerate the flow of propellant thereto. In this embodiment, which eliminates the need for any major mechanical or electrical power input, a float-controlled valve may be included in the driving-fluid connection so as to throttle the fluid feedback to the secondary jet pump when the liquid in the vaporizer exceeds a predetermined level. In order to keep this pump primed for continuity of operation, I prefer to provide it with a bypass for the recirculation of branched-off coolant to the downstream section of the main fluid path whenever the input of driving fluid to the secondary jet pump is throttled.

According to another advantageous feature of my invention, I may provide flow-control means for redirecting the output of the vaporizer through the cooling coil to the branch line at a point ahead of the secondary pump thereof, but independently of the primary pump and the expansion valve in the main path, whereby that cooling coil is converted into a heating coil as the circulating fluid transfers some of the heat of the exhaust gases to the atmosphere surrounding the coil.

The above and other features of my invention will be described in greater detail hereinafter with reference to the accompanying drawing in which.

Figure 1:
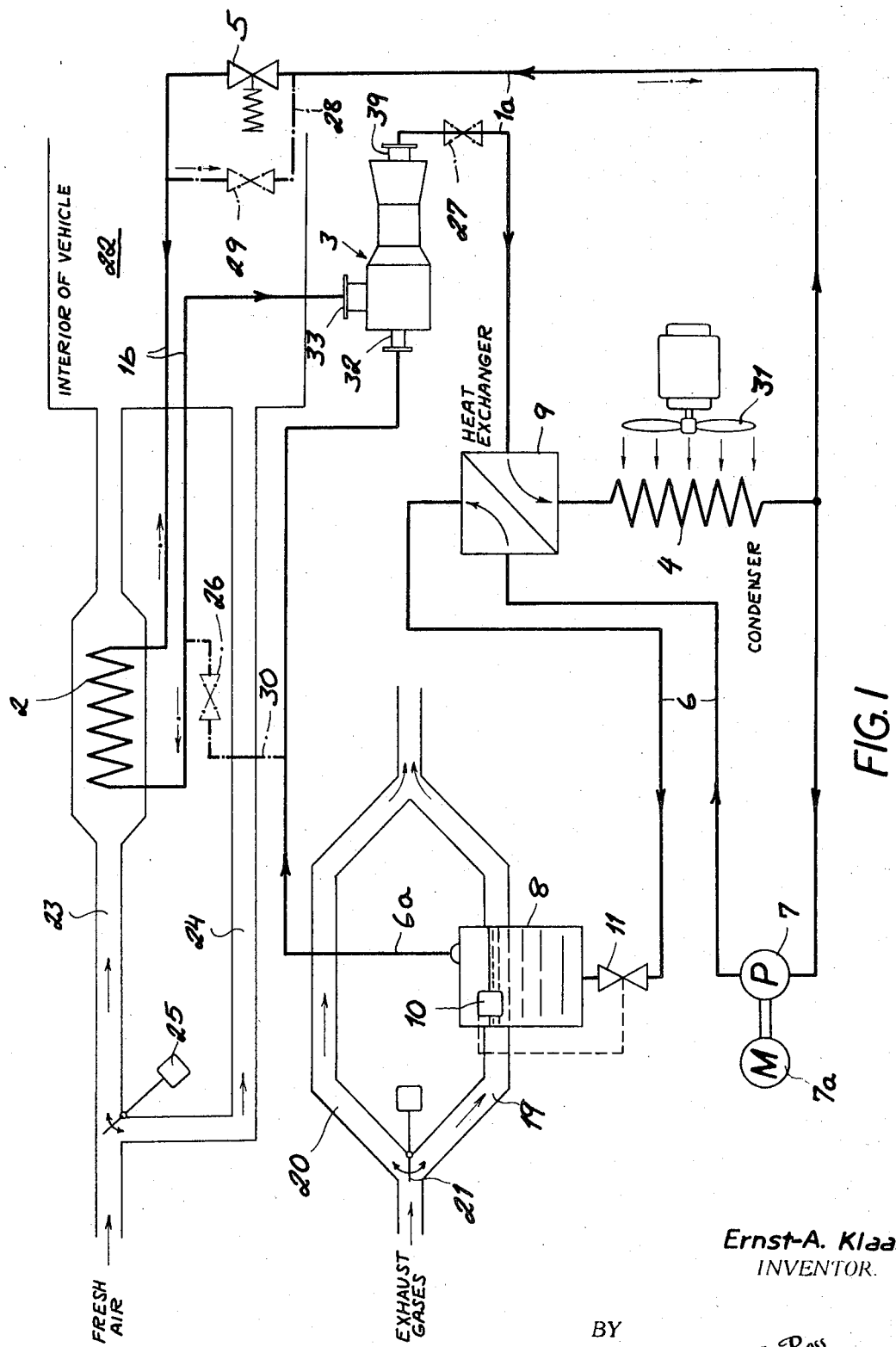
FIG. 1 is a diagrammatic view of an air conditioner embodying my invention.

The air-conditioning system of FIG. 1, designed for a passenger car whose interior is indicated diagrammatically at 22, comprises a set of conduits forming a closed fluid-circulation path with a downstream section 1a and an upstream section 1b as seen from a jet pump 3 acting as a compressor for the fluid (e.g. Freon). The two sections are separated from each other, at a point remote from jet pump 3, by an expansion valve 5 through which the cooling fluid passes on its way to a coil 2 disposed in a fresh air channel 23 which communicates with the vehicular interior 22. A baffle 25 allows regulation of the cooling effect by deviating a selected portion of the fresh-air stream from the channel 23 into a branch path 24. A condenser 4 in the downstream section 1a exposes the compressed fluid from jet pump 3 to a cooling stream of ambient air generated by a motor-driven blower 31, such as the fan normally provided behind the radiator of a water-cooled automotive engine. Thus, the main body of the cooling fluid, vaporized in coil 2 by its heat exchange with the relatively warm surrounding air, is compressed by the jet pump 3 and liquefied in condenser 4 where it gives off excess heat to the atmosphere before being re-expanded at valve 5.

A portion of this circulating fluid, after leaving the condenser 4, is branched off via a conduit 6 which includes a second pump 7 and leads to an inlet 32 of primary pump 3 via a vaporizer 8 and an extension line 6a. Vaporizer 8 comprises a vessel for the temporary storage of the liquid refrigerant, a float 10 in that vessel controlling a valve 11 at the inlet of the vaporizer. The control device 11 need merely be a simple shutoff valve which opens when the liquid level is low and closes when it is high. Pump 7, driven by a motor 7a, is designed in the aforedescribed manner to prevent the buildup of excessive back pressure in conduit 6 upon closure of valve 11. Vaporizer 8 is located in a duct 19 which is traversed by the vehicular exhaust gases so that the waste heat of the gases is utilized to volatilize the portion of coolant which is to act as a propellant for the fluid admitted to the main inlet 33 of pump 3 and discharged from its outlet 39 together with the propellant. Duct 19 is one of two parallel branches, the second branch 20 bypassing the vaporizer 8 and forming with branch 19 a junction in which a baffle 21 is adjustable to control the heating effect by deviating part of the oncoming gases into branch 20.

A heat exchanger 9 thermally interconnects the conduits 1a and 6 whereby some of the sensible heat of the compressed but not liquefied fluid downstream of jet pump 3 is transferred to the propellant in the branch circuit for preheating same; this increases the thermal efficiency of the system.

Figure 2:
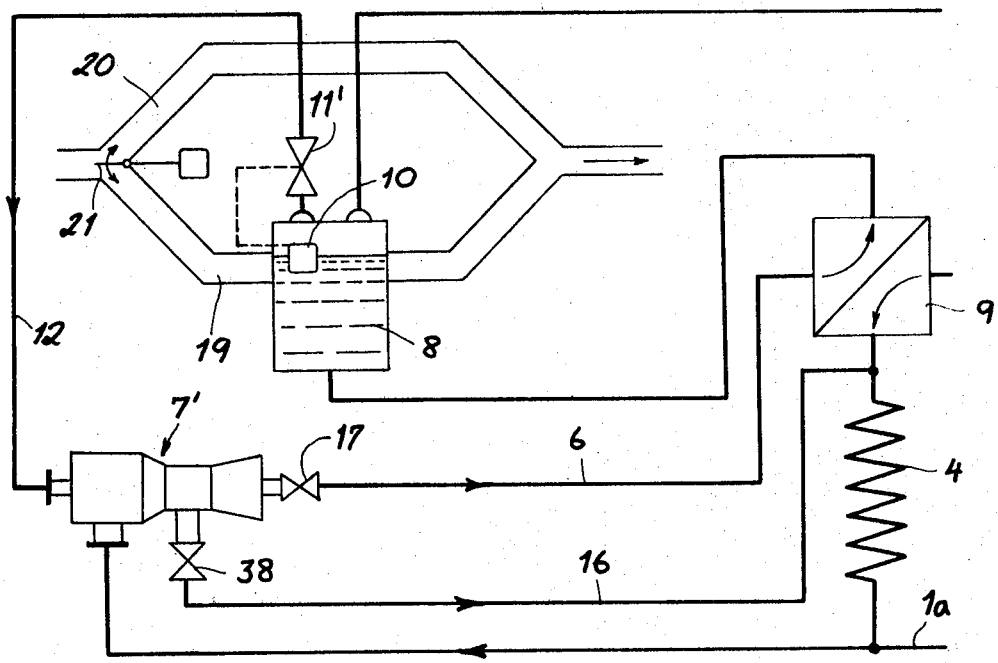
FIG. 2 is a similar view of part of the system of FIG. 1, illustrating a modification.
Figure 3:
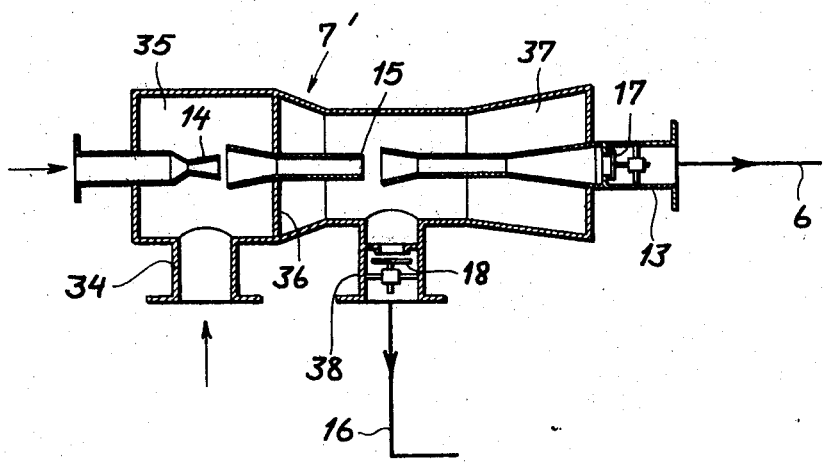
FIG. 3 is a cross-sectional view of a secondary jet pump forming part of the system of FIG. 2.

In the modified system of FIG. 2 the mechanical pump 7 has been replaced by a second jet pump 7' whose internal construction has been illustrated in FIG. 3. A fluid line 12, receiving some of the vapor from vessel 8, terminates at a tube 14 constituting a secondary inlet for the admission of driving fluid, the main inlet for the circulating propellant being shown at 34. The two inlets 14, 34 open into an entrance compartment 35 which is separated by a partition 36 from an exit compartment 37 having a main outlet 13 for the circulating propellant and a secondary outlet 38 for overflowing gases, the partition 36 being traversed by a nozzle 15 which is coaxial with the inlet and outlet tubes 14 and 13. Nozzle 15 has a flared intake end confronting the reduced discharge end of inlet tube 14 and forming therewith a small gap in the region of main inlet 34; similarly, the intake end of outlet tube 13 is flared and confronts the reduced discharge end of nozzle 15 across a gap in the region of secondary outlet 38. The two outlets 13, 38 are provided with respective check valves 17 and 18. Outlet 38 discharges into a bypass 16 to return excess fluid to conduit 1a at a point just ahead of condenser 4.

In FIG. 2 the float 10 of vaporizer 8 controls a throttle valve 11' located in the driving-fluid line 12. With the liquid level in vaporizer 8 above its predetermined mark, valve 11' restricts the vapor flow to inlet 14 of jet pump 7' whereby the propellant entering at inlet 34 and aspirated into the nozzle 15 is entrained with sufficient force to open the check valve 18 but with not enough force to open the check valve 17. Under these conditions, therefore, the propellant is recirculated through bypass 16 and condenser 4 without reaching the vaporizer 8. When, however, the liquid in the vaporizer drops below its designated level, float 10 fully opens the valve 11' so that the increased fluid pressure in inlet 14 of pump 7' drives most or all of the entering propellant via outlet 13 into vessel 8. Check valve 17, of course, prevents any backflow of liquid from the vaporizer into the pump 7'; similarly, check valve 18 avoids the direct feeding of fluid from jet pump 3 to jet pump 7' without prior passage through condenser 4. The internal construction of the main jet pump 3, not shown in detail, may be similar to that illustrated for pump 7' except for the omission of partition 36, nozzle 15 and outlet 38, with the discharge end of the inlet tube 32 confronting directly the intake end of the outlet tube 39.

In order to adapt the system for winter driving, I provide a set of flow-control valves 26, 27, 29 designed to direct the heated vapors from vessel 8 in the reverse sense through the coil 2, as indicated in dot-dash lines, while excluding the pump 3 and the expansion valve 5 from the circuit. Valve 26 is inserted in a conduit 30 and, when open, connects the outlet 6a of the vaporizer to a point between pump 3 and coil 2, the path through the pump being blocked by the valve 27 which is closed under these conditions. Valve 29, inserted in a bypass 28 around expansion valve 5, is also open so that the fluid may return to pump 7 (or 7') after having given off part of its heat to the surrounding atmosphere in air channel 23. A single switch, not shown, controls the changeover from cooling to heating, or vice versa, by the simultaneous adjustment of valves 26, 27 and 29.

The check valves 17 and 18 shown in FIG. 3 may be designed as simple flap or poppet valves and can be made of nonmetallic material capable of withstanding the dynamic stresses of operations.

The bias of valve 18 should be sufficient to close same when, upon the opening of valve 17, a partial vacuum is generated in compartment 37.

I claim:

1. An air conditioner for an automotive vehicle including a source of waste heat, comprising:
   conduit means forming a closed circuit for a cooling fluid;
   a jet pump and an expansion valve remote from said jet pump disposed in said circuit for dividing said conduit means into an upstream section of relatively low fluid pressure and a downstream section of relatively high fluid pressure, said upstream section including a coil in heat-exchanging relationship with a surrounding air channel communicating with the interior of the vehicle;
   condenser means in said downstream section in heat-exchanging relationship with ambient air for liquefying the circulating fluid;
   a branch line deviated from said downstream section at a location beyond said condenser means and terminating at said jet jump for supplying thereto a portion of the liquefied fluid as a propellant for fluid expanded in said upstream section;
   feed means for said propellant in said branch line;
   vaporizing means in said branch line exposed to said source of waste heat for gasifying said propellant;
   and heat-exchanger means traversed by said branch line and by said downstream section ahead of said condenser means for preheating said propellant on its way to said vaporizing means and precooling the circulating fluid on its way to said condenser means.

2. An air conditioner as defined in claim 1 wherein said vaporizing means includes a vessel for liquid propellant and level-control means for stabilizing the volume of liquid in said vessel.

3. An air conditioner as defined in claim 2 wherein said feed means comprises a second jet pump with a driving-fluid connection extending from said vessel.

4. An air conditioner as defined in claim 3 wherein said level-control means includes valve means in said driving-fluid connection for selectively throttling the flow of propellant vapors to said second jet pump.

5. An air conditioner as defined in claim 4 wherein said second jet pump is provided with a main inlet for said propellant from said downstream section, a secondary inlet for propellant vapors from said driving connection, a main outlet leading to said vaporizer, and a secondary outlet ahead of said main outlet connected in a bypass to said downstream section ahead of said condenser means for recirculating at least part of said propellant upon a reduction in vapor pressure at said secondary inlet by said valve means.

6. An air conditioner as defined in claim 5 wherein said second jet pump has a housing separated by a partition into a first compartment provided with said inlets and a second compartment provided with said outlets, said secondary inlet and main outlet comprising a first and a second tube coaxially disposed and terminating short of said partition, said second jet pump further including a nozzle coaxial with said tubes traversing said partition, said nozzle being spaced from said first tube by a first gap in the region of said main inlet and from said second tube by a second gap in the region of said secondary outlet, said outlets being provided with respective check valves.

7. An air conditioner as defined in claim 1 wherein said source of waste heat comprises an exhaust duct with a pair of branches and adjustable damper means at a common inlet to said branches, one of said branches containing said vaporizing means.

8. An air conditioner as defined in claim 1 wherein said air channel is provided with a bypass path branching off said air channel at a location ahead of said coil, further comprising adjustable damper means at said location.

9. An air conditioner as defined in claim 1, further comprising flow-control means for redirecting the vapors through said coil to said branch line at a point ahead of said feed means independently of said jet pump and said expansion valve.

a branch line deviated from said downstream section at a location beyond said condenser means and terminating at said jet pump for supplying thereto a portion of the liquefied fluid as a propellant for fluid expanded in said upstream section;
   vaporizing means in said branch line exposed to said source of waste heat for gasifying said propellant, said vaporizing means including a vessel for liquid propellant;
   a second jet pump in said branch line with a driving-fluid connection extending from said vessel;
   and valve means in said driving-fluid connection for selectively throttling the flow of propellant vapors to said second jet pump in response to a rise in the liquid volume of said vessel above a predetermined level, said second jet pump being provided with a main inlet for said propellant from said downstream section, a secondary inlet for propellant vapors from said driving connection, a main outlet leading to said vaporizer, and a secondary outlet ahead of said main outlet connected in a bypass to said downstream section ahead of said condenser means for recirculating at least part of said propellant upon a reduction in vapor pressure at said secondary inlet by said valve means.

10. An air conditioner for an automotive vehicle including a source of waste heat, comprising:

conduit means forming a closed circuit for a cooling fluid;

a jet pump and an expansion valve remote from said jet pump disposed in said circuit for dividing said conduit means into an upstream section of relatively low fluid pressure and a downstream section of relatively high fluid pressure, said upstream section including a coil in heat-exchanging relationship with a surrounding air channel communicating with the interior of the vehicle;

condenser means in said downstream section in heat-exchanging relationship with ambient air for liquefying the circulating fluid;

11. An air conditioner as defined in claim 10 wherein said second jet pump has a housing separated by a partition into a first compartment provided with said inlets and a second compartment provided with said outlets, said secondary inlet and main outlet comprising a first and a second tube coaxially disposed and terminating short of said partition, said second jet pump further including a nozzle coaxial with said tubes traversing said partition, said nozzle being spaced from said first tube by a first gap in the region of said main inlet and from said second tube by a second gap in the region of said secondary outlet, said main outlet being provided with a first check valve biased to open under a relatively high pressure in said second compartment, said secondary outlet being provided with a second check valve biased to open under a relatively low pressure in said second compartment.